Patented Mar. 2, 1948

2,436,920

UNITED STATES PATENT OFFICE 2,436,920

FLY SPRAYS COMPRISING AN N,N-DIALKYLCINNAMAMIDE AND DDT

Samuel I. Gertler and Herbert L. J. Haller, Washington, D. C., assignors to the United States of America, as represented by the Secretary of Agriculture No Drawing. Application October 9, 1944, Serial No. 557,918

3 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to insecticidal spray compositions for combating flies, gnats, mosquitoes, and similar insects.

Extracts of insecticidal plant products, such as pyrethrum flowers, derris, cube, barbasco, timbo, and the like, are widely used for the control of insect pests of the type mentioned above. Toxic agents of these types are generally employed in a solvent, such as a mineral oil fraction like refined kerosene, naphtha, and so forth. Sprays containing pyrethrins have been found very useful due to their quick paralyzing or knockdown action on flies and the like. However, low concentrations are generally used because of the high cost, and in such concentrations the percentage kill is relatively low compared to the percentage knockdown. Extracts of rotenone-containing plants, such as derris, cube, and the like, give a higher kill over a much longer period of time, but lack a knockdown action. A spray composition, therefore, which combines the properties of high knockdown and high kill is most desirable.

The object of this invention is the provision of economical insecticidal spray compositions having high percentage of both knockdown and kill.

The above object is accomplished by preparing a composition composed of a stable, substantially odorless and colorless knockdown agent which, in itself, has little or no insecticidal value against the insects to be combated, but which has a high knockdown value, and an insecticidal toxic agent which shows high kill over an extended period of time, but gives no appreciable knockdown. Such compositions, containing as essential active ingredients a knockdown agent and an insecticidal toxic agent, have been found to be highly effective insecticidal compositions against flying insects.

We have discovered that N,N-dipropylcinnamamide and N,N-diisopropylcinnamamide have an unusually high knockdown effect, but little or no toxicity to houseflies. They have been found to be compatible with known insecticides, and when combined therewith, produce superior insecticidal compositions of high knockdown and kill.

The following Examples III and IV illustrate this invention while Examples I and II show the value of N,N-dipropylcinnamamide and N,N-diisopropylcinnamamide as knockdown agents.

Example I

A 5% solution of N,N-dipropylcinnamamide in refined kerosene gave a 95% knockdown of houseflies in 10 minutes, with a resultant negligible kill of 5% in 24 hours.

Example II

A 5% solution of N,N-diisopropylcinnamamide in refined kerosene gave an 88% knockdown of houseflies in 10 minutes, with a resultant negligible kill of 4% in 24 hours.

Example III

A refined kerosene solution containing 5% of N,N-dipropylcinnamamide as a knockdown agent, and 1 milligram per milliliter of 2,2-bis(p-chlorophenyl)-1,1,1-trichloroethane as a toxic agent produced a fly spray which gave a knockdown substantially equivalent to high grade commercial pyrethrum sprays, and, in addition, a far higher kill.

Example IV

A refined kerosene extract of derris or cube root comprising 5% of N,N-dipropylcinnamamide as a knockdown agent produced a fly spray which gave a knockdown substantially equivalent to high grade commercial pyrethrum sprays, and, in addition, a far higher kill.

Roots practically free of rotenone, but which contain rotenoids can also be used. By "rotenoids" are meant substances other than rotenone but structurally related to it, naturally occurring in leguminous fish-poison plants, e. g., derris, Lonchocarpus, Mundulea, and Tephrosia (R. C. Roark, Journal of Economic Entomology, volume 33, page 416 (1940)). This gives a more economical product since either low grade roots, or roots from which most of the rotenone has been removed, can be employed.

It is to be understood that other toxic agents may be used which give a high kill, but possess little or no knockdown value. Also, the proportions of the ingredients may be varied so as to produce a well balanced fly spray.

The advantage of compositions of this invention is that the paralyzing action of the knockdown agent probably weakens the insects and thereby renders them easier to kill. Accordingly, weaker toxic agents, or smaller percentages of stronger toxic agents, may be employed than could be employed without the knockdown agent.

Having thus described our invention, we claim:

1. A fly spray comprising a member selected from the group consisting of N,N-dipropylcinnamamide and N,N-diisopropylcinnamamide as its essential knockdown agent and 2,2-bis(p-chlorophenyl)-1,1,1-trichloroethane as its essential active insecticidal ingredient, incorporated in a mineral oil carrier.

2. A fly spray comprising N,N-dipropylcinnamamide as its essential knockdown agent and 2,2-bis(p-chlorophenyl)-1,1,1-trichloroethane as its essential active insecticidal ingredient, incorporated in a mineral oil carrier.

3. A method of destroying flying insects comprising contacting said insects with a composition containing a member selected from the group consisting of N,N-dipropylcinnamamide and N,N-diisopropylcinnamamide as its essential knockdown agent, and 2,2-bis(p-chlorophenyl)-1,1,1-trichloroethane as its essential active insecticidal ingredient.

SAMUEL I. GERTLER.
HERBERT L. J. HALLER.

REFERENCES CITED

The following references are of record in the file of this patent:

UNITED STATES PATENTS

| Number | Name | Date |
|---|---|---|
| 2,326,350 | Gerther et al. | Aug. 10, 1943 |
| 2,350,324 | Coleman et al. | June 6, 1944 |
| 2,354,193 | Bowen | July 25, 1944 |

OTHER REFERENCES

Roark, Jr. Econ. Entom., v. 34, Oct. 1941, pages 684 to 691.